March 13, 1962  V. PHILIPCHUK ET AL  3,024,526
EXPLOSIVE WELDING

Filed Aug. 31, 1960  2 Sheets-Sheet 1

INVENTOR.
FRANKLIN L. BOIS
BY VASIL PHILIPCHUK

Eckhoff & Slick
ATTORNEYS

INVENTOR.
FRANKLIN L. BOIS
VASIL PHILIPCHUK
BY
Eckhoff & Slick
ATTORNEYS

United States Patent Office 3,024,526
Patented Mar. 13, 1962

3,024,526
EXPLOSIVE WELDING
Vasil Philipchuk, North Scituate, and Franklin Le Roy Bois, Middleboro, Mass., assignors, by mesne assignments, to Atlantic Research Corporation, a corporation of Virginia
Filed Aug. 31, 1960, Ser. No. 56,084
12 Claims. (Cl. 29—470)

This is a continuation-in-part of our application Serial No. 817,706 filed May 29, 1959, now abandoned.

This invention relates in general to he welding of metal and more particularly to a process whereby metal surfaces may be welded together using an explosive charge.

It is, in general, an object of this invention to provide a method for forming gas-tight welds.

Still another object of this invention is to provide a novel method for generating the heat and pressure necessary to form a gas-tight weld between metals of a specified maximum degree of hardness.

In the drawings:

FIGURE 5 shows the appearance of plates which have been welded according to the process variation of which FIGURE 4 is illustrative;

Figure 1:
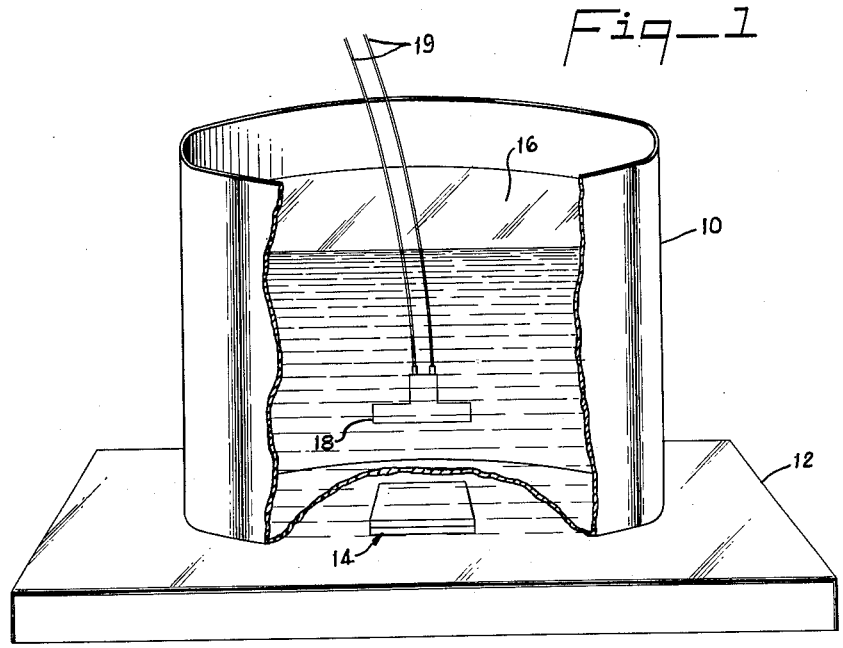
FIGURE 1 shows a typical apparatus set-up for performing the process of this invention.

Generally, it has been found that pieces of metal, whether similar or dissimilar, may be welded together, provided that at least one of the metals being welded is of lesser hardness than molybdenum (M.P. 2620° C.) by a method which relies, for the heat necessary to form the required molten surfaces, upon the sudden compression of a specified quantity of gas between the metal surfaces being welded. The compressive effect is due to a sudden increase in hydraulic pressure upon one of the metal elements and the necessary sudden increase in pressure is, in turn, provided by the detonation of a high explosive beneath the surface of a reservoir of hydraulic fluid positioned adjacent the surface of one of the elements.

More particularly, it has been found that if care is exercised to maintain a critical minimum quantity of air and no more than a critical maximum quantity of air between the two metal surfaces to be welded and if the weld site is separated from an hydraulic fluid only by a diaphragm (to prevent the hydraulic fluid from replacing the gas between the metals) and, finally, if a high explosive is detonated beneath the surface of the fluid, the explosive being selected so that a certain critical ratio of gas volume to pressure can be obtained, a gas-tight weld may be effected in a very short time—in the order of one millisecond.

It has been found that the hydraulic fluid may be eliminated provided that the explosive used is selected so as to insure pressures at the weld site at least as great as those specified hereinafter.

The method may be used to weld similar or dissimilar metals together, provided one of the metals used has a lower melting point than 2700° C. For example, the method of this invention has been successfully employed in welding:

(1) Molybdenum to molybdenum;
(2) Stainless steel to stainless steel;
(3) Nickel to nickel;
(4) Zircalloy-2 to Zircalloy-2;
(5) Stainless steel to carbon steels;
(6) Nickel to stainless steel;
(7) Aluminum alloys to each of the following:
   a. Aluminum alloys
   b. Stainless steels
   c. Carbon steels
   d. Titanium alloys
   e. Nickel alloys
   f. Molybdenum alloys
   g. Zircalloy-2.

The method may also be used in what may be termed a "cladding" operation whereby a thin metal liner may be formed inside a pipe. A smooth weld is formed at the metal interfaces. The procedure is the same as that used in welding flat surfaces, the only difference being in the relative thickness of one of the two metals involved. Cladding entails a very thin layer of one metal bonded to a relatively thicker layer of a second metal.

It is possible also to weld three layers of metal simultaneously to form a sandwich. The use of a thin foil as the internal layer is especially advantageous since such material tends readily to melt, thus to insure a secure bond.

The gaseous layer separating the surfaces to be welded may be a single gas or a mixture, as air. While there is nothing critical about the specific gas used, the spacing or standoff of the metals is extremely important since this determines the amount of gas to be compressed. If too little gas is present on application of a given pressure, insufficient heat will be generated properly to soften the metal surfaces. Alternatively, if too much gas is present on application of a given pressure, some will fail to be expressed as intended, but will be trapped between the surfaces, thus resulting in a porous weld. Thus, the ratio of gas volume to pressure must remain within a given range. Lessened gas volumes will justify somewhat lessened pressures while greater gas volumes will require greater pressures and hence more powerful explosives.

Another very critical feature which affects the detonation velocities, pressures and quantities of gas required in the melting point of the metals used. Where a weld is to be formed involving any metal or metal alloy having a melting temperature of 600–900° C. such as aluminum, either to itself or to another metal, the volume of gas between the surfaces to be welded should be between 1 and 3 cc. per linear foot of 1 inch width. Expressed differently, a good working range is between about 0.08 cc. and 0.25 cc. gas per square inch of surface to be welded. The pressure requirement for such metals, measured as the pressure produced by the effect of the explosive gases on water, is between about 50,000 and 70,000 p.s.i. and the explosive used should have a detonation velocity of between about 20,000 and 30,000 feet per second.

Where both metals being welded having melting temperatures in excess of 900° C., e.g., steel to be welded either to itself or to another equally high melting metal, the gas volumes required are approximately those stated above. For example, for a line weld of ½ inch width, 0.5 to 1.5 cc. per linear foot are required. However, greater pressures are necessary, pressures on the order of 80,000 to 120,000 p.s.i. being required with a detonation velocity of 20,000 to 30,000 feet per second. Typical welds of this type include nickel to nickel alloy, nickel alloy to stainless steel or stainless steel to stainless steel.

As stated, when higher melting metals are welded, gas volumes are used which are identical to those listed for the lower melting metals but the greater pressures generated in the latter process variation result in the generation of the additional heat necessary to weld these harder metals.

The quantities and pressures listed may be varied somewhat, as indicated, since similar results can be obtained by reducing the gas volumes and pressures as long as the proportions of gas to pressure remain the same and do not drop too low.

As indicated above, the explosives preferably are immersed directly in the hydraulic fluid, conveniently water. Any explosive is satisfactory which has a detonation rate equal to or greater than the minimum rate required for the type of metal used. For example, "Tetryl," "H–6," "Primacord," "Trona" explosives "502" to "508," "PETN," "RDX" and "TNT" have all been used successfully.

The thickness of the metals used is not particularly critical unless the metal is of such thickness and strength that the explosive force transmitted by the fluid medium is incapable of forcing the meal surfaces to conform, in which event the process obviously will not work satisfactorily. Also, one must be cautious in attempting to weld thick pieces of metal together (e.g. ends of rods) as the force of the explosion may cause the metal to collapse. Finally, if extremely thick pieces of metal are treated according to the process of this invention, results may not be entirely satisfactory as a "heat sink" may be formed, i.e., the heat generated by the compression of gas between the metal surfaces may be dissipated rapidly into the substantial volumes of adjacent metal, thus precluding the proper localization of the heating effect and the desired softening of the metal surfaces at the interfaces.

Referring now to the drawings, wherein like characters refer to like parts throughout, the process is most conveniently carried out by simply placing a conventional 2 and ½ gallon cardboard ice cream can 10 atop a steel block 12 and positioning therebetween the assembly 14 to be welded. The ice cream can contains a suitable hydraulic fluid 16, of density 0.8 to 1.2 grams per cc. An explosive charge 18 is positoned a preselected distance from the base of the can 10. The charge is electrically detonated by means of wires 19 from a remote means, not illustrated. A commercial blasting cap is used to detonate the explosive.

Figures 2, 3:
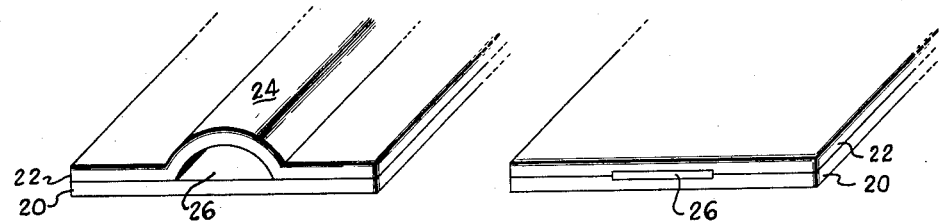
FIGURE 2 shows a process variation wherein the two metal surfaces have been placed together preparatory to forming the weld.
FIGURE 3 shows the appearance of the plates shown in FIGURE 2 after a weld has been formed.

As shown in the figures, the surfaces of the elements can be arranged in a number of manners. Referring to FIGURE 2, there is shown a lower plate 20 having a second plate 22 positioned thereover, the second plate having therein a linear semicylindrical depression 24. In practice, the arrangement shown in FIGURE 2 will be found to be exaggerated as the quantity of air required between the plates is substantially less than that which would be indicated in FIGURE 2, but the structure has been so shown for clarity of illustration.

Upon detonation of the explosive, the raised portion 24 collapses and, as shown in FIGURE 3, a weld 26 forms between the two plates in the area 26. On compression of raised area 24 due to hydraulic pressure, the air within the space is compressed and rushes out at a great velocity and the metal surfaces adjacent thereto melt and fuse together.

Figure 4:
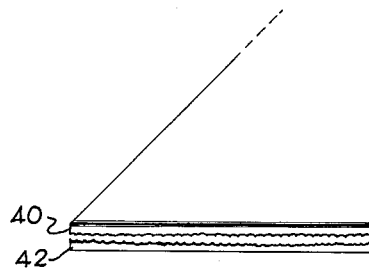
FIGURE 4 shows an alternative method for securing the necessary gas volume between plates to be welded.
Figure 5:
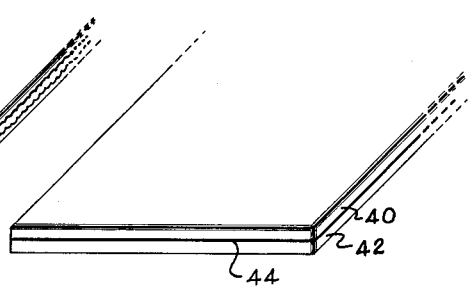

The second process variation is depicted in FIGURES 4 and 5 wherein two metal plates 40 and 42 are shown adjacent one another. If surfaces to be welded have been etched, a network of cavities is formed which provides many bonding surfaces and a better weld than might otherwise be obtainable. The surfaces of the metal plates shown in FIGURE 4 have been etched, as with sulfuric acid, to an extent sufficient to insure the proper quantity of air between the adjacent surfaces and in FIGURE 5 the welded area has been formed by the mechanism described earlier.

Figure 6:
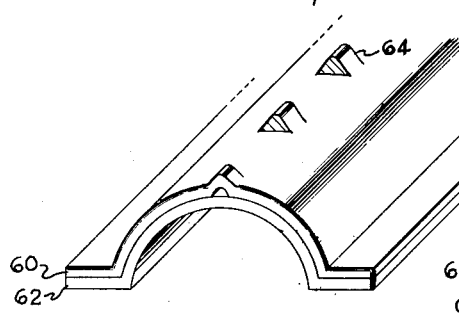
FIGURE 6 shows still another process set-up suitable for the formation of spot welds.
Figure 7:
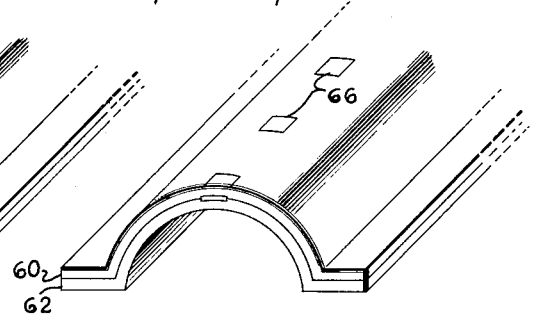
FIGURE 7 shows the appearance of metal plates which have been welded according to the technique to which FIGURE 6 relates.

Spot welds may be formed, as shown in FIGURES 6 and 7. Dimpled plate 60 is secured to plate 62 and the raised portions 64 are collapsed and welds 66 formed by the mechanism already described.

Figure 8:
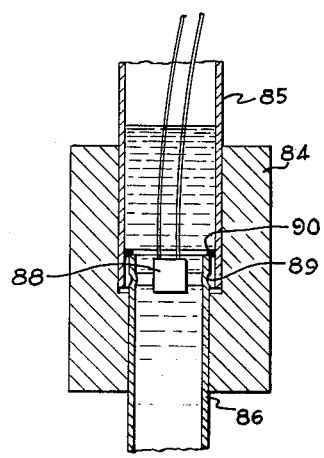
FIGURE 8 shows the set-up utilized when it is desired to weld two pipes of dissimilar diameter together.

Pipes can also be welded in the manner in FIGURE 8. Here the split die 84 surrounds the larger pipe 85 and the smaller pipe 86. Pipe 86 has an outside diameter less than the inside diameter of pipe 85 and thus telescopes thereinto. With the overlapping ends of the two pipes held in the split die, the explosive 88 is detonated and the two pipes thus fuse together in the area corresponding to groove 89. A seal 90 prevents the hydraulic fluid from filling the air space between the pipes, and pipe 86 is plugged at its lower end.

In the case of welding two pipes together, the inside surface of the die can: (a) be smooth so that a flat weld results; (b) have a circular ridge so that a grooved weld results; or (c) have a circular groove so that a raised weld results.

In a typical preferred procedure, as when welding aluminum to aluminum, the weight of explosive which produces the required 50,000 to 70,000 p.s.i. at the weld site, when fired at the selected standoff, is calculated. An explosive is then selected which has a detonation velocity in the region of at least about 20,000 feet per second. The plates are taped together in such a fashion that adequate air remains between them. Any other means desired may be used for holding the plates together but the use of tape of some kind is a convenient procedure. An expendable container, such as a 2 and ½ gallon cardboard ice cream can, is filled with water and the charge is immersed at the selected standoff. The explosive is then detonated.

In another typical procedure wherein steel is welded to steel, the surfaces to be welded are etched with chemicals (e.g. $H_2SD_4$ or $HNO_3$). In alternative procedures, an abrasive compound is used either with or without the chemical etching. The treated surfaces are placed face-to-face on the foundation of the welding set-up. The explosive is selected so that its detonation velocity is in the region of at least 20,000 feet per second and preferably 25,000 feet per second, and the weight of explosive which will produce 80,000 to 120,000 p.s.i. for the selected standoff is calculated. Thereafter, the steps are identical to those described with respect to the aluminum operation above.

Examples are set forth below showing preferred embodiments of this invention. These are for illustrative purposes only and are not to be construed as imposing limitations on the scope of the invention other than as set forth in the appended claims.

*Example 1.—Sheet to Sheet Without Etch*

Material: Aluminum alloy to aluminum alloy; mating surfaces were roughed with emory to remove oxides.
Size: 2" x 2" x .062" thick to 2" x 2" x .062".
Location: One sheet on top of the other and both placed flat on a steel foundation plate.
Air between sheets: From .005" to .015" average thickness.
Explosive container: 9½" x 9½" cardboard container holding water and 25 grams RDX high explosive (20,000 to 25,000 ft./sec. detonation rate), located 1¾" above the material to be welded and in the water.
Detonator: A No. 6 cap.
Approximate pressure at weld site: 50,000 to 70,000 p.s.i.

*Example 2.—Sheet to Sheet Without Etch*

Material: Nickel alloy to stainless steel mating surfaces were roughed with emory to remove oxides.
Size: ¾" x 2" x .062" thick x ¾" x 2" x .062" thick.
Location: Same as Example 1.
Air between sheets: Same as Example 1.
Explosive container: Same as Example 1 except that explosive weight was 36 grams of RDX and the explosive was located 1¼" above the material to be welded.
Detonator: Same as Example 1.
Approximate pressure at weld site: 80,000 to 120,000 p.s.i.

The above examples for .062" material have also been applied to material from .020" to .125" thick without changing the test conditions.

*Example 3.—Sheet to Sheet With Etch*

Material: Stainless steel to stainless steel (both types 17–7).
Size: ½" x 2½" x .015" to ½" x 2½" x .062".
Location: Same as Example 1.
Etch preparation: Nitric acid was used to etch the surfaces of the material to be welded. The acid was dabbed onto the surfaces and then the acid-treated surfaces were washed with water to prevent further etching about 2 minutes after applying the acid.
Explosive container: Same as Example 1 except that the explosive was located 1½" above the material and the explosive weight was 30 grams.
Detonator: Same as Example 1.
Approximate pressure at weld site: 100,000 p.s.i.

*Example 4.—Tube to Tube Without Etch*

Material: Aluminum tube to stainless steel tube.
Size: 1.66" O.D. x .137" wall aluminum type 3003 tube to 1.898" O.D. x .148" wall stainless steel type 304 tube.
Location: The aluminum tube was inserted into the stainless steel tube so that ¾" of length was overlapped.
Air between tubes: The aluminum tubes O.D. was reduced for this ¾" to 1.588" O.D. leaving a .007" thick air space between the overlap.
Explosive container: A steel die enclosed the walls of both tubes. The inside of the tubes contained a 1¼" diameter rubber insert enclosing a 2½ grams of Tetryl explosive which was centered relative to the tubes. The remainder of the cavity was filled with water. The joint was sealed with masking tape to prevent water seepage to the welding area.
Detonator: No. 6 electric blasting cap.
Approximate pressure at weld site: 100,000 p.s.i.

*Example 5.—High Temperature Sheet to High Temperature Sheet With Etch*

(Molybdenum or its alloys, or other metals and their alloys, having melting points of 1800° C. to 2700° C.)

Material: Molybdenum (½% titanium) to molybdenum (½% titanium).
Size: 1" x 1" x 0.040" to 1" x 1" x 0.040".
Location: Same as Example 1.
Etch preparation: Concentrated nitric acid was used to etch the surfaces to be welded. The sheets were immersed in the acid for 120 seconds (two minutes) and then washed with water to remove any traces of acid.
Explosive container: Same as Example 1 except that the explosive was located one inch above the material, and the explosive weight was 75 grams.
Detonator: Same as Example 1.
Approximate pressure at weld site: 150,000 to 250,000 p.s.i.

*Example 6.—Sheet to Sheet Without Hydraulic Medium and With Etch*

Material: 1020 steel to 1020 steel.
Size: 3" x 3" x 0.030" to 3" x 3" x 0.030".
Location: Same as Example 1.
Explosive container: Same as Example 1 except that the explosive was on the bottom of the container. The water on the side and above the explosive charge was used only to dampen the noise from the explosion. The explosive weight was 100 grams.

Medium: A one-inch thickness of chipboard was placed between the explosive and the top sheet of steel as the medium to transmit the forces for welding.
Detonator: Same as Example 1.
Approximate pressure at weld site: 150,000 to 300,000 p.s.i.

All of the above tests produced gas-tight welds.

As is evident, this process does not depend upon heat being transmitted from the explosive directly to the site of the weld. Rather, the only heat utilized in forming the weld is that which is created as the gas between the surfaces to be welded is compressed and expressed.

As can be seen from the foregoing, the "diaphragm" referred to throughout this specification may consist of the bottom of a cardboard carton, the seal 90 taken together with the telescoped portion of inner pipe 86 shown in FIGURE 8 or any other means for maintaining the hydraulic fluid out of direct contact with that portion of the plate assembly 14 which serves as an air vent at the time the metal elements are forced together.

Obviously, many modifications and variations of this invention may be made without departing from the spirit and scope thereof, and therefore only such limitations as are indicated in the appended claims should be imposed.

We claim:
1. A method for welding a first metal object and a second metal object together, each of the first and second metal objects having a melting point less than 2700° C., comprising: placing said objects with confronting surfaces to be welded closely adjacent on another while providing a space between said surfaces, said space representing at least about 0.08 cc. per square inch to be welded; providing a gas in the said space; placing an exterior surface of one of said metal objects so positioned in contact with a diaphragm having hydraulic fluid in contact with the opposite side thereof, whereby to maintain said fluid out of contact with the space between said surfaces; supporting the other of the said metal objects to be welded by means of a rigid support on the exposed side thereof, the said exposed side being opposite from the said exterior side of the other of said metal objects adjacent the said diaphragm; and detonating a high explosive charge beneath the surface of said hydraulic fluid, said explosive charge being so positioned relative to said diaphragm that a pressure of at least about 50,000 lbs. per square inch is exerted at the weld site when said charge is detonated, whereby to transmit hydraulic pressure to the said metal objects whereby gas in the said space is compressed and heated to a temperature sufficient to soften the confronting metal surfaces and fuse the said surfaces, the pressure being sufficient to provide for the simultaneous expression of substantially all of said gas from the said space.

2. The method of claim 1 wherein the metals to be welded each have melting temperature of less than 900° C. and wherein the pressure produced on the exterior metal surfaces by the said hydraulic fluid ranges between about 50,000 and 70,000 p.s.i.

3. The method of claim 2 wherein the space between the confronting surfaces is sufficient to contain between about 0.08 cc. and 0.25 cc. gas per square inch of surface to be welded.

4. The method of claim 1 wherein the metals to be welded each have melting temperatures in excess of 900° C. and wherein the pressure produced upon the exterior surfaces of the metal objects by the said hydraulic fluid ranges between 80,000 and 120,000 p.s.i.

5. The method of claim 4 wherein the space between the confronting surfaces of the said metal objects is sufficient to contain between about 0.08 and 0.25 cc. gas per square inch of surface to be welded.

6. The method of claim 1 wherein at least one of said surfaces has been etched.

7. The method of claim 1 wherein one metal object is a cylindrical tube and a second metal object is a cylindrical tube of lesser exterior diameter than the interior diameter of the said first tube, the two tubes being placed in a telescoping relationship and a seal being provided between the said tubes to prevent fluid leakage therebetween, the said tubes being filled in the area of the said telescoping relationship with an hydraulic fluid.

8. The method of claim 1 wherein both metal objects are aluminum.

9. The method of claim 1 wherein both metal objects are steel.

10. The method of claim 1 wherein one metal object is steel and the second metal object is aluminum.

11. The method of claim 1 wherein both metal objects are molybdenum.

12. A method for welding a first metal object and a second metal object together, each of the first and second metal objects having a melting point less than 2700° C., comprising: placing said objects with confronting surfaces to be welded closely adjacent one another while providing a space between said surfaces, said space representing at least about 0.08 cc. per square inch to be welded; providing a gas in the said space; supporting one of said metal objects to be welded on the exposed surface thereof by means of a rigid support; positioning a high explosive charge opposite the exposed surface of the said second metal object and detonating said charge, said explosive charge having a detonation velocity of at least about 20,000 feet per second, said explosive charge being so positioned relative to said metal objects that a pressure of at least about 50,000 pounds per square inch is exerted at the weld site when said charge is detonated, whereby gas in the said space is compressed and heated to a temperature sufficient to soften the confronting metal surfaces and fuse the said surfaces, the pressure being sufficient to provide for the simultaneous expression of substantially all of said gas from the said space.

References Cited in the file of this patent

UNITED STATES PATENTS

| | | |
|---|---|---|
| 1,355,224 | Gravell | Oct. 12, 1920 |
| 2,030,803 | Temple | Feb. 11, 1936 |
| 2,779,279 | Maiwurm | Jan. 29, 1957 |
| 2,816,211 | Hutchins | Dec. 10, 1957 |

FOREIGN PATENTS

| | | |
|---|---|---|
| 115,846 | Sweden | Feb. 9, 1946 |
| 766,741 | Great Britain | Jan. 23, 1957 |

UNITED STATES PATENT OFFICE
CERTIFICATE OF CORRECTION

Patent No. 3,024,526                     March 13, 1962

Vasil Philipchuk et al.

It is hereby certified that error appears in the above numbered patent requiring correction and that the said Letters Patent should read as corrected below.

Column 6, line 31, for "on" read -- one --.

Signed and sealed this 13th day of November 1962.

SEAL)
ttest:

NEST W. SWIDER
testing Officer

DAVID L. LADD
Commissioner of Patents